United States Patent
Swerdlow et al.

(10) Patent No.: US 9,977,781 B2
(45) Date of Patent: *May 22, 2018

(54) TECHNIQUES FOR PERFORMING LANGUAGE DETECTION AND TRANSLATION FOR MULTI-LANGUAGE CONTENT FEEDS

(71) Applicant: Google Inc., Mountain View, CA (US)

(72) Inventors: Andrew Swerdlow, San Francisco, CA (US); Navdeep Jagpal, Montreal (CA)

(73) Assignee: GOOGLE LLC, Mountain View, CA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/299,948

(22) Filed: Oct. 21, 2016

(65) Prior Publication Data

US 2017/0039189 A1    Feb. 9, 2017

Related U.S. Application Data

(63) Continuation of application No. 14/458,685, filed on Aug. 13, 2014, now Pat. No. 9,477,659, which is a
(Continued)

(51) Int. Cl.
*G06F 17/28* (2006.01)
*G06F 17/27* (2006.01)
(Continued)

(52) U.S. Cl.
CPC ........ *G06F 17/289* (2013.01); *G06F 3/04817* (2013.01); *G06F 3/04842* (2013.01);
(Continued)

(58) Field of Classification Search
None
See application file for complete search history.

(56) References Cited

U.S. PATENT DOCUMENTS

| 5,040,218 A | 8/1991 | Vitale et al. |
|---|---|---|
| 6,623,529 B1 | 9/2003 | Lakritz |

(Continued)

FOREIGN PATENT DOCUMENTS

| WO | 9718516 | 5/1997 |
|---|---|---|
| WO | 2010105383 A1 | 9/2010 |

OTHER PUBLICATIONS

Cavnar, William B., and John M. Trenkle. "N-gram-based text categorization." Ann Arbor MI 48113.2 (1994): 161-175.

*Primary Examiner* — Douglas Godbold
(74) *Attorney, Agent, or Firm* — RMCK Law Group, PLC

(57) ABSTRACT

A technique for translating a portion of a website includes receiving a language set of a user indicating a primary language of the user is received. A content feed to be displayed to the user is received and parsed to identify a text portion of a user generated content. The original language of the text portion is determined and compared with the one or more languages in the language set. When the original language of the text portion does not match the languages in the language set: (i) the text portion, the original language, and the primary language are provided to a translation engine, (ii) a translated version of the text portion is received from the translation engine, (iii) the translated version of the text portion is inserted into the content feed to obtain a modified content feed, and (iv) the modified content feed is displayed to the user.

20 Claims, 8 Drawing Sheets

Related U.S. Application Data continuation of application No. 13/279,568, filed on Oct. 24, 2011, now Pat. No. 8,812,295.

(60) Provisional application No. 61/511,885, filed on Jul. 26, 2011.

(51) Int. Cl.
*G06F 3/0481* (2013.01)
*G06F 3/0484* (2013.01)
*H04L 12/58* (2006.01)

(52) U.S. Cl.
CPC ........ *G06F 17/2705* (2013.01); *G06F 17/275* (2013.01); *H04L 51/046* (2013.01)

(56) References Cited

U.S. PATENT DOCUMENTS

| | | | |
|---|---|---|---|
| 6,901,367 B1* | 5/2005 | Berstis | G10L 15/26 704/270 |
| 7,231,600 B2 | 6/2007 | Zhou et al. | |
| 7,610,187 B2 | 10/2009 | Jaquinta | |
| 7,890,493 B2 | 2/2011 | Chen | |
| 8,027,438 B2 | 9/2011 | Daigle et al. | |
| 8,812,295 B1* | 8/2014 | Swerdlow | G06F 17/2705 704/2 |
| 9,053,202 B2* | 6/2015 | Viswanadha | G06F 17/30899 |
| 9,477,659 B2* | 10/2016 | Swerdlow | G06F 17/2705 |
| 2007/0085835 A1 | 4/2007 | Plestid et al. | |
| 2009/0198487 A1* | 8/2009 | Wong | G06F 17/28 704/4 |
| 2009/0248392 A1 | 10/2009 | Talwar et al. | |
| 2010/0106482 A1 | 4/2010 | Hardacker et al. | |
| 2010/0121629 A1 | 5/2010 | Cohen | |
| 2010/0283829 A1 | 11/2010 | Beer et al. | |
| 2010/0286977 A1* | 11/2010 | Chin | G06F 17/289 704/4 |
| 2012/0277003 A1 | 11/2012 | Eliovits et al. | |
| 2012/0296628 A1 | 11/2012 | Wren et al. | |
| 2013/0006602 A1* | 1/2013 | Zhu | G06F 17/289 704/2 |
| 2013/0066624 A1* | 3/2013 | Pattan | G06F 17/289 704/2 |
| 2013/0151233 A1 | 6/2013 | Gande et al. | |

* cited by examiner

TECHNIQUES FOR PERFORMING LANGUAGE DETECTION AND TRANSLATION FOR MULTI-LANGUAGE CONTENT FEEDS

CROSS-REFERENCE TO RELATED APPLICATIONS

This application is a continuation of U.S. patent application Ser. No. 14/458,685, filed on Aug. 13, 2014, which is a continuation of U.S. patent application Ser. No. 13/279,568, filed on Oct. 24, 2011, now U.S. Pat. No. 8,812,295, issued Aug. 19, 2014, which claims the benefit of U.S. Provisional Application No. 61/511,885, filed on Jul. 26, 2011. The entire disclosure of each of the above applications is incorporated herein by reference.

FIELD

The present disclosure generally relates to a method and system for performing language detection and translation for multi-language content feeds.

BACKGROUND

Social media is quickly making the world smaller. The international community is becoming more connected through social websites, such as social networking websites, blogs, microblogs, content sharing websites, and other types of social media. Many of these types of media are based on user generated content, where many users provide commentary in the form of comments or portions of text. A content viewing user can receive commentary from one or more content sources and can read and respond with additional commentary of his or her own. For example, in a social networking site, a viewing user may receive a content feed that includes commentary from one or more content providing users. A content feed can include a stream consisting of a plurality of user generated content from one or more content providing users. The viewing user can also provide commentary in response to commentary viewed in the content feed or original commentary, which in turn can be viewed by other users in their respective content feeds. In another example, users of a video sharing website can login and provide comments to the video to be displayed in a content feed near the video. The commentary is viewable to other viewers of the website containing the video.

As can be appreciated from the foregoing examples, various social website providers have connected users from around the world and rely on user generated content, e.g., commentary, to enhance their respective offerings. A primary barrier to connecting users from the international community is the language barrier, namely, users will typically provide commentary in languages with which they are most comfortable but which are not understood by all viewing users. Accordingly, there is a need for a tool that allows viewing users to receive commentary in a content feed in their native language regardless of the language used by the content providing users.

SUMMARY

This section provides a general summary of the disclosure, and is not a comprehensive disclosure of its full scope or all of its features.

In various embodiments of the present disclosure, a computer implemented technique is disclosed. The technique includes receiving a language set of a viewing user, the language set including one or more languages and a primary language indicator that identifies one of the one or more languages as a primary language of the viewing user. Additionally, the technique includes receiving an aggressiveness setting of the viewing user. The technique further includes receiving a content feed to be displayed to the viewing user, the content feed including user generated content having at least one text portion, and parsing a document object model representing the content feed. The technique also includes determining a user generated content element in the document object model. The user generated content element represents the user generated content. The technique further includes determining a text portion element of the user generated content element that contains the at least one text portion. The technique also includes determining an original language of the at least one text portion by: (i) providing the at least one text portion to a language determination engine and receiving a potential language classification for the at least one text portion and a confidence score associated therewith, (ii) comparing the confidence score to a threshold, wherein the threshold is based on the received aggressiveness setting, (iii) when the confidence score is greater than the threshold, adopting the potential language classification of the at least one text portion as the original language, and (iv) when the confidence score is less than the threshold, adopting one of the one or more languages in the language set as the original language such that original language of the at least one text portion matches one of the one or more languages in the language set. The technique also includes comparing the original language of the at least one text portion with the one or more languages in the language set. When the original language of the at least one text portion does not match one of the one or more languages in the language set, the technique includes: (i) providing, to a translation engine, the at least one text portion, the original language of the at least one text portion and the primary language indicator, (ii) receiving, from the translation engine, a translated version of the least one text portion, the translated version corresponding to a translation of the least one text portion from the original language to the primary language of the viewing user, (iii) inserting the translated version of the least one text portion into the content feed to obtain a modified content feed, and (iv) providing the modified content feed for display to the viewing user.

In various embodiments of the present disclosure, a computer implemented technique is disclosed. The technique includes receiving a language set of a viewing user, the language set including one or more languages and a primary language indicator that identifies one of the one or more languages as a primary language of the viewing user. The technique further includes receiving a content feed to be displayed to the viewing user, the content feed including user generated content having at least one text portion, and parsing the content feed to identify the user generated content and the at least one text portion. The technique also includes determining an original language of the at least one text portion and comparing the original language of the at least one text portion with the one or more languages in the language set. When the original language of the at least one text portion does not match one of the one or more languages in the language set, the technique includes: (i) providing, to a translation engine, the at least one text portion, the original language of the at least one text portion and the primary language indicator, (ii) receiving, from the translation engine, a translated version of the least one text portion, the translated version corresponding to a translation of the least one text portion from the original language to the primary language of the viewing user, (iii) inserting the translated version of the least one text portion into the content feed to obtain a modified content feed, and (iv) providing the modified content feed for display to the viewing user.

In various embodiments of the present disclosure, a technique for translating a portion of a content feed is disclosed. The technique includes a user settings datastore that stores a language set of a viewing user, the language set including one or more languages and a primary language indicator that identifies one of the one or more languages as a primary language of the viewing user. The technique further includes a content feed analysis module that receives a content feed to be displayed to the viewing user, the content feed including user generated content having at least one text portion. The technique also includes a text determination module that parses the content feed to identify the user generated content and the at least one text portion, and a text analysis module that (i) determines an original language of the at least one text portion, and (ii) compares the original language of the at least one text portion with the one or more languages in the language set. The technique further includes a text modification module and a display module. When the text analysis module determines that the original language of the at least one text portion does not match one of the one or more languages in the language set: (i) the text analysis module provides the at least one text portion, the original language of the at least one text portion and the primary language indicator to a translation engine, (ii) the text analysis module receives a translated version of the least one text portion from the translation engine, the translated version corresponding to a translation of the least one text portion from the original language to the primary language of the viewing user, (iii) the text modification module inserts the translated version of the least one text portion into the content feed to obtain a modified content feed, and (iv) the text modification module provides the modified content feed to a display module for displaying the modified content feed to the viewing user.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

As social media expands in popularity and usefulness, the connectedness of people is increasing. One form of social media is a social website, which can include any type of website that allows users to provide content that is viewable by other users. For purposes of explanation, a user that provides content to a social website can be a content providing user, and a user that is viewing the content can be a viewing user. The two types of users are not mutually exclusive, as a user can be both a content providing user and a viewing user depending on whether the user is providing content or viewing content.

Social websites span many different types of platforms. Common to all social websites is that some, if not all content, is user generated content. For instance, some social websites allow users to create profiles and allow viewing users to view the profiles of other users. In some of these sites, the viewing users can also provide commentary on the other user's profile, e.g., by providing a comment about a picture or a posted news story. Other social websites may allow users to generate their own content, and other viewing users can view the user generated content. Other websites may allow users to post audio or video files, and any user can provide commentary. Some social websites, such as blogs, may have one or more primary contributing users that provide all of the main content, but other users can comment in response to the main content. Some websites, e.g., message boards, allow users to create thread topics to which other users can respond. For purposes of explanation, the term social website or website can include any type of website where multiple users can provide some type of user generated content in the form of comments or commentary. The user generated content is displayed to a viewing user in the form of a content feed.

Figure 1:
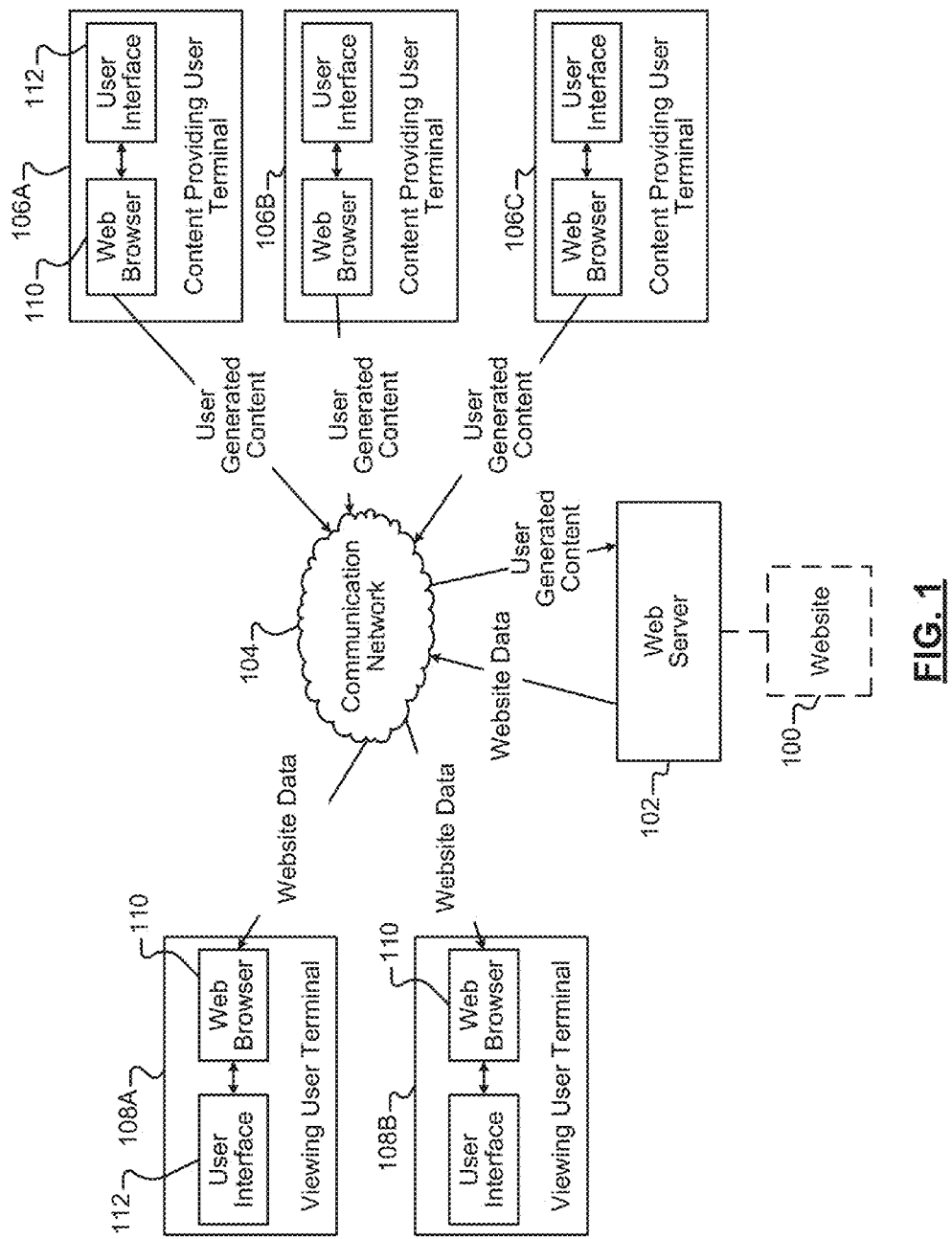
FIG. 1 is a schematic block diagram illustrating an exemplary environment of a social website and a technique according to some embodiments of the present disclosure.

FIG. 1 illustrates an exemplary environment for a social website 100 that receives user generated content from content providing users and provides website data, including a content feed, to viewing users. As should be appreciated, the website 100 is hosted by a web server 102. The web server 102 communicates with a plurality of content providing user terminals, 106A, 106B, and 106C (collectively referred to herein by reference numeral 106) and a plurality of viewing user terminals 108A and 108B (collectively referred to herein by reference numeral 108) over a communications network 104 (the Internet, a private network, etc.). As discussed above, a user may be both a content providing user and a viewing user depending on whether the user is providing content or viewing content, respectively. It is appreciated that the terminals 106, 108 may be any suitable device, including but not limited to, a computer (desktop, laptop, tablet, etc.), a mobile telephone, a video game console, or a personal digital assistant (PDA).

Viewing user terminals 108 and content providing user terminals 106 each individually include a web browser 110 and a user interface 112. A content providing user can provide user generated content to the web server 102 using the user interface 112 and the web browser 110 on the content providing user terminal 106. For example, a user can provide user generated content by entering text via the user interface 112 (such as, a keyboard, mouse, touchscreen display, computer monitor or combination thereof). The web browser 110 will receive the text entry of the user and generate output data containing the user generated content. The output data can be in any suitable format, such as HTML or XML. The web server 102 receives the output data, for example, by way of the communication network 104, and parses the user generated content from the output data.

The web server 102 transmits website data, including a content feed, representing the website 100 to the viewing user terminal 108, for example, by way of the communication network 104. As mentioned above, a content feed can include user generated content from a plurality of content providing users. The web browser 110 of a viewing user terminal 108 receives the website data and displays a representation of the website 100, including the content feed, via the user interface 112.

Figure 2:
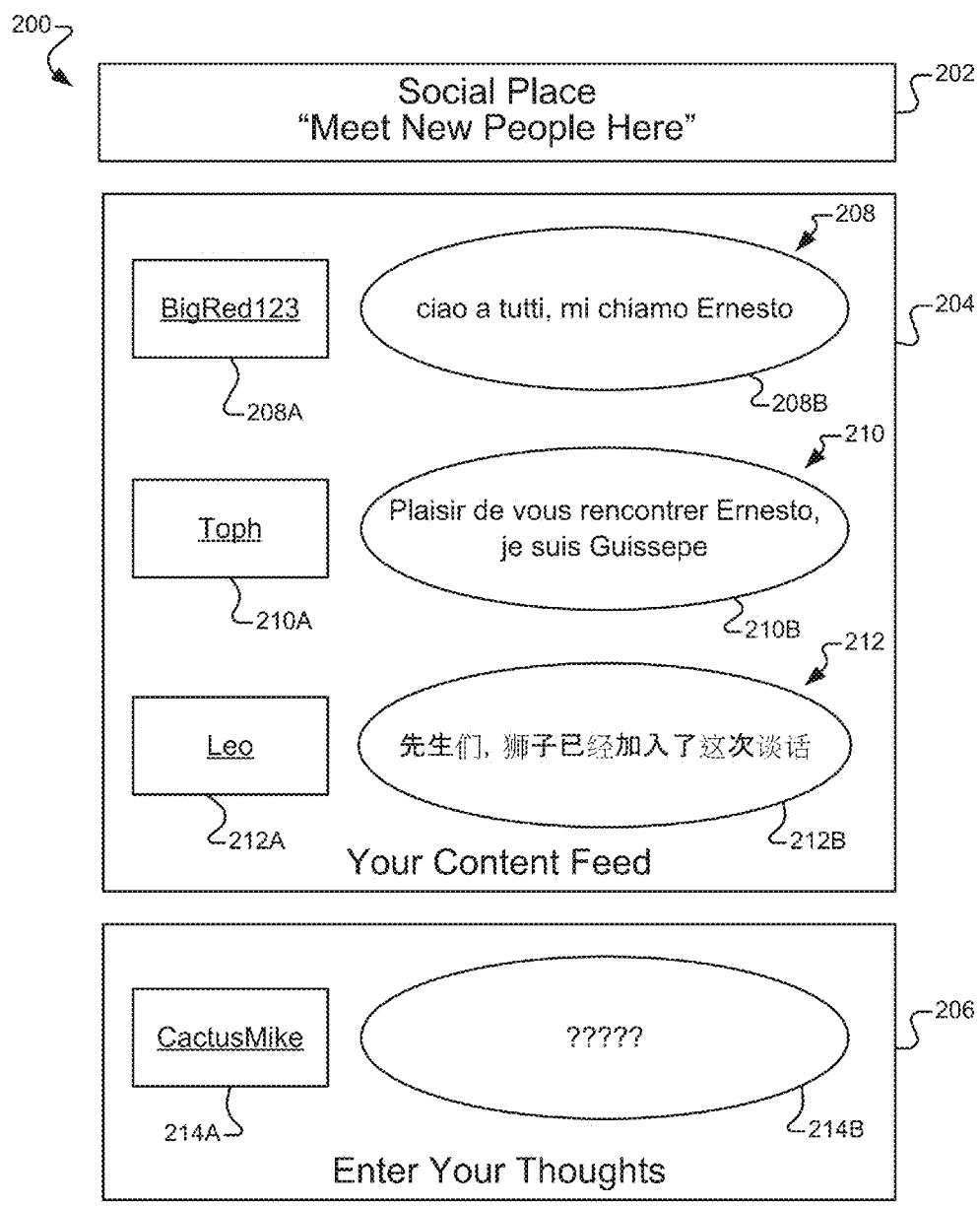
FIG. 2 is an exemplary screen shot of the social website of FIG. 1.

An issue that arises with users of social websites is possible language barriers between some of the content providing users and viewing users. FIG. 2 illustrates an exemplary screen shot 200 of a social website 100. The screen shot 200 is meant to provide an example of a multi-language content feed and is not intended to be limiting. In the example, the screen shot 200 is divided into a banner area 202, a content feed area 204, and a user generated content entry area 206. The banner area 202 can identify the website 100, e.g., "The Social Place," and provide additional information, such as providing a motto or description of the website's 100 purpose, e.g., "Meet New People Here." The content feed area 204 displays the content feed. In this example, a first content 208 is comprised of a first user handle 208A and a first text portion 208B. In this example, the first text portion 208B is provided in the Italian language. A second content 210 is comprised of a second user handle 210A and a second text portion 210B. In this example, the second text portion 210B is in the French language. A third content 212 is comprised of a third user handle 212A and a third text portion 212B. In this example, the third text portion 212B is in the Chinese language. The user generated content entry area 206 allows the viewing user to provide content. In this example, the screen shot 200 includes a viewing user handle 214A, e.g., CactusMike, and a viewing user text portion 214B to enter text, e.g., "????". As can be appreciated from the viewing user's text portion in the example, the user does not understand some or all of the content displayed in the content feed 204.

Figure 3:
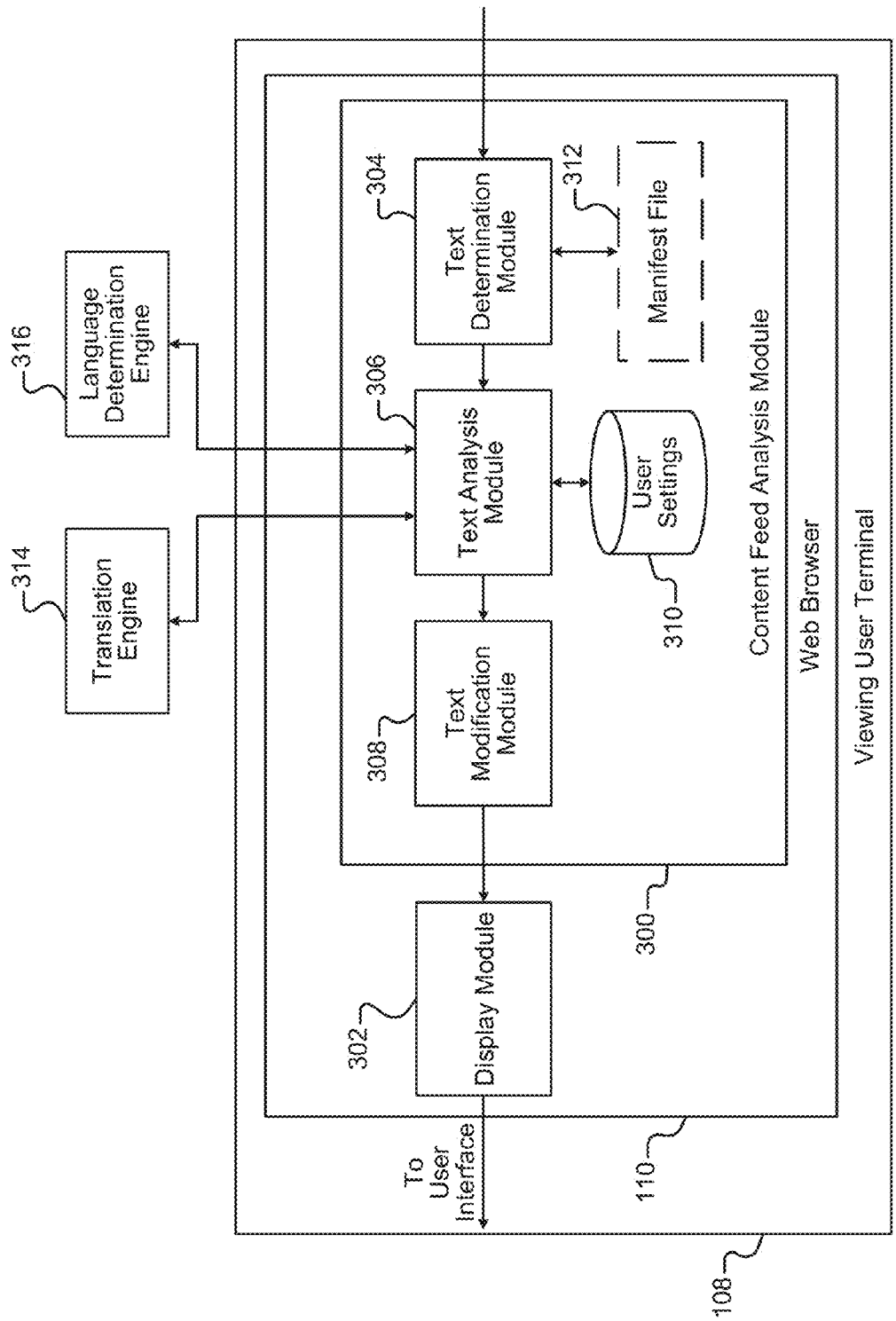
FIG. 3 is a schematic block diagram illustrating exemplary components of a web browser according to some embodiments of the present disclosure.

FIG. 3 illustrates an exemplary technique for performing language determination and translation of a multi-language content feed, such as content feed 204. In various exemplary embodiments, the technique includes a content feed analysis module 300 implemented as a component of a web browser 110. The web browser 110 includes the content feed analysis module 300 and a display module 302. The content feed analysis module 300 includes a text determination module 304, a text analysis module 306, a text modification module 308, and a user settings datastore 310. In some embodiments, the content feed analysis module 300 may further include a manifest file 312, described further below. The content feed analysis module 300, in particular the text analysis module 306, may be in communication with a language determination engine 316 and a translation engine 314 to determine whether a text portion of the content feed 204 content is in a foreign language and, if so, to translate the foreign text portion. It is appreciated that the translation engine 314 and the language determination engine 316 may be integrated on the viewing user terminal 108 or may be implemented at a remote server (not shown), e.g., located in "the cloud."

A viewing user may request to access the website 100, for example, by providing a URL of the desired website. After the address of the website 100 is resolved from the URL, a request is transmitted by the web browser 110 to the web server 102, requesting the website 100 corresponding to the resolved address. The web server 102, in response, transmits website data corresponding to the requested website 100. The website data may be in any suitable format, e.g., HTML or XML. The display module 302 is configured to display a website 100 by interpreting the website data.

The text determination module 304 receives the website data. As can be appreciated, some websites do not include content feeds. Thus, the text determination module 304 determines whether the website 100 contains a parsable content feed. If the website 100 is determined to not include a parsable content feed, the text determination module 304 does not analyze the website data any further. If the website 100 is determined to include a parsable content feed, the text determination module 304 analyzes the website data to determine whether the content feed or portion thereof should be translated, as described more fully below.

In some embodiments, the text determination module 304 compares the URL of the website with the manifest file 312 to determine if the website data includes a parsable content feed. In these embodiments, the manifest file 312 can contain a plurality of URLs corresponding to a list of websites that are known to include a parsable content feed. If the URL of the website 100 is found in the manifest file 312, then the text determination module 304 parses the content feed to identify any user generated content. It is noted that any other suitable means for determining whether a website includes a content feed can be implemented by the text determination module 304.

As mentioned, each portion of user generated content may include a user handle and a text portion. The text determination module 304 identifies the text portion of each user generated content. In some embodiments, the text determination module 304 may be configured to receive a document object model (DOM) of the HTML code representing the requested website. A DOM hierarchically represents the logical structure of the received HTML code, including individual portions of user generated content. The text determination module 304 can be configured to access the DOM and to obtain the text portion of each user generated content in a content feed.

Figure 4A:
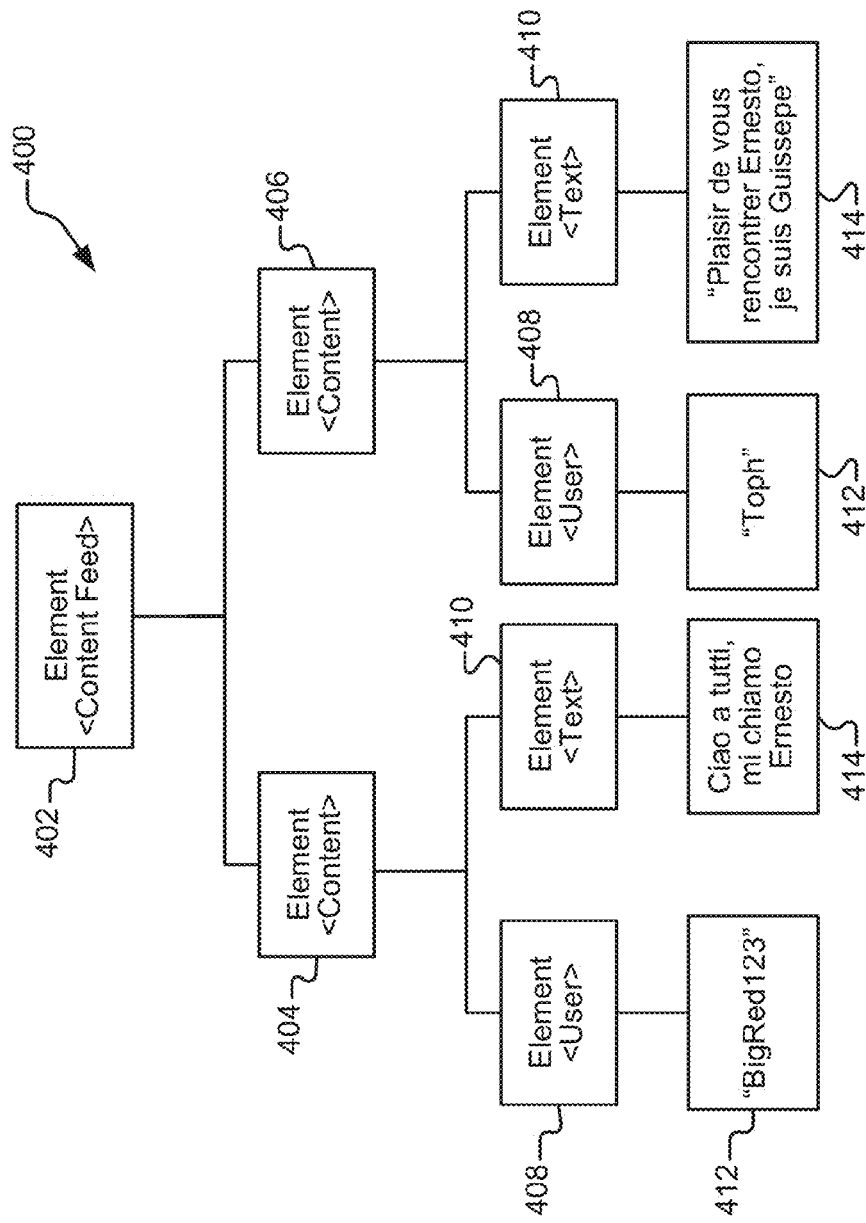
FIGS. 4A and 4B are schematic block diagrams illustrating exemplary document object models according to some embodiments of the present disclosure.

FIG. 4A illustrates an exemplary DOM 400 corresponding to a portion of the content feed shown in FIG. 1. In the website data, e.g., HTML code, of a social website 100, the content feed may be identified as an element 402. In the depicted DOM 400, the content feed element 402 is shown at the highest level. It is appreciated, however, that the content feed element 402 is likely below additional elements of the website data. For example, the content feed element 402 may be below a body element (not shown) and a root element (not shown). The content feed may include a plurality of user generated content. In the exemplary DOM 400, the content feed is shown as including user generated content elements 404 and 406. A user generated content element 404, 406 may include a user element 408 and a text element 410. In this example, the user element 408 includes a user handle 412, e.g., "BigRed123," and the text element 410 includes a text portion 414, e.g., "ciao a tutti, mi chiamo Ernesto." It is appreciated that the foregoing is provided only to provide an example of a DOM 400 and is not intended to be limiting.

The text determination module 304 can access the DOM 400 of the website 100 to identify the content feed. From the content feed, the text determination module 304 can identify user generated content, e.g., user generated content element 404. From the identified user generated content element 404, the text portion 414 can be identified. The identified text portion 414 is provided to the text analysis module 306.

The text analysis module 306 receives a text portion 414 of a user generated content, determines whether the text portion 414 requires translation and, if so, has the text portion 414 translated by the translation engine 314. The text analysis module 306 can access the user settings datastore 310 and language determination engine 316 to make the determination as to whether a text portion 412 requires translation.

The user settings datastore 310 can store a language set of a user. The language set may be a list of languages that includes one or more languages claimed to be understood by the viewing user. Furthermore, the language set can include a primary language indicator that identifies, of the languages in the language set, the viewing user's primary language. The primary language is the language in which the viewing user prefers to have the content feed appear. The language set may further include the viewing user's secondary languages, if any. The viewing user's secondary languages are languages other than the primary language that the user claims to understand. In some embodiments, the viewing user can select the one or more languages to be included in the language set. The user settings datastore 310 can also store an aggressiveness setting that determines how aggressive the text analysis module 306 should be in classifying the language of a text portion 414, as described in greater detail below.

The text analysis module 306 transmits a text portion 414 of the user generated content to the language determination engine 316. The language determination engine 316 receives the text portion 414 and attempts to classify its original language, i.e., the language in which it originally appears. The language determination engine 316 analyzes the received text portion 414 to determine one or more potential language classifications of the text portion 414 and an associated "confidence score" for each potential language classification. The confidence score of a potential language classification indicates a degree of confidence in the corresponding classification of the text portion. It is appreciated that the language determination engine 316 may operate in any suitable manner and may be implemented on the viewing user terminal 108 or on a remote server (not shown).

Based on the confidence score, the text analysis module 306 either adopts or rejects the potential language classification returned by the language determination engine 316 as the original language of the text portion 414. For example only, the text analysis module 306 compares the confidence score of the highest ranked potential language classification with a threshold indicated by the aggressiveness setting. If the confidence score exceeds the threshold, then the text analysis module 306 adopts the potential language classification as the original language of the associated text portion 414. If the confidence score of the highest ranked potential language classification does not exceed the threshold indicated by the aggressiveness setting, then translation is not performed on the text portion 414. This may be accomplished, for example, by adopting one of the languages in the language set as the original language of the text portion 414.

The text analysis module 306 compares the original language of the text portion 414 with the one or more languages in the language set. If the original language of the text portion 414 does not match a language in the language set, the text portion 414 is considered to be in a foreign language. In this scenario, the text portion 414 is transmitted to the translation engine 314 by the text analysis module 306. Further, the original language of the text portion 414 and the primary language indicator can also be provided to the translation engine 314.

If, however, the original language of the text portion 414 matches one of the languages in the language set, then the text portion 414 is not translated. Additionally, if the confidence score of the highest ranked potential language classification does not exceed the threshold indicated by the aggressiveness setting, then the text analysis module 306 may be programmed to determine that the original language (the highest ranked potential language classification) matches one of the languages in the language set such that translation is not performed on the text portion 414.

The translation engine 314 can be any suitable engine operable to perform translation. The translation engine 314 receives a text portion 414 to be translated, an original language of the text portion 414, and a target language of the text portion 414. The target language can be, for example, the primary language of the viewing user stored in the user settings datastore 310. The translation engine 314 translates the text portion 414 from the source language into the target language. The translation engine 314 returns a translated version of the text portion 414 to the text analysis module 306. The translation engine 314 may be implemented on a remote server (not shown), on the viewing user terminal 108, or some combination thereof. Furthermore, the translation engine 314 and the language determination engine 316 may be implemented at the same or different servers. Examples of the translation engine 314 and the language determination module 316 may be an API supported by an online machine translation tool.

The text modification module 308 receives the website data, including the content feed, and any translated text portions of user generated content from the text analysis module 306. The text modification module 308 inserts the translated version of the text portion(s) into the content feed to obtain a modified content feed such that the translated version of the text portion is displayed to the viewing user when the display module 302 displays a representation corresponding to the website data, which include the modified content feed.

Figure 4B:
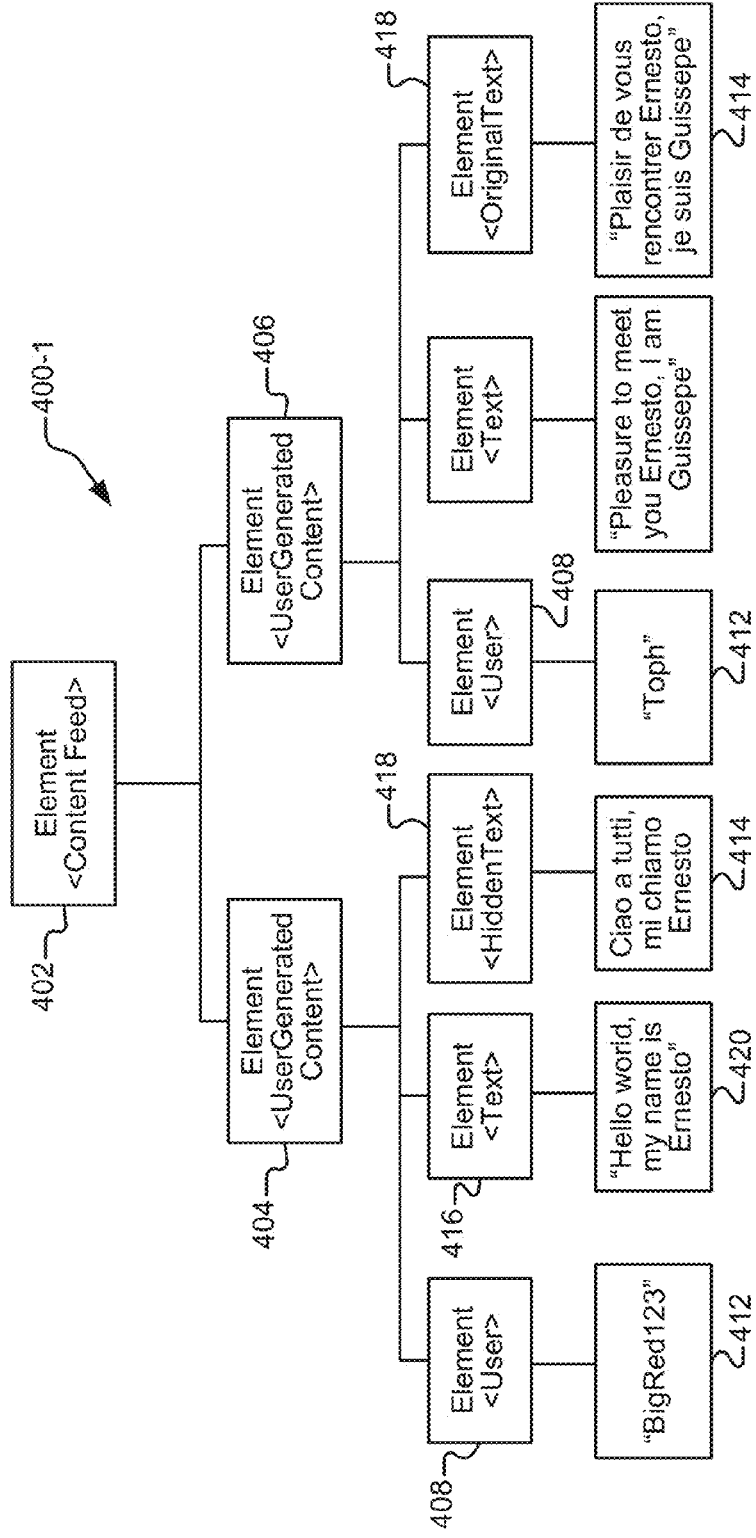

In some embodiments, the text modification module 308 will also hide the original text portion 414. For example, in embodiments where a DOM 400 is used to identify text portions 414 of the content feed, the text modification module 308 modifies the DOM 400 to obtain a modified DOM 400-1 (FIG. 4B) that includes the translated text portion in a text element 416 and moves the original text to a newly created element, e.g., an "original text" element 418. As was explained with respect to FIG. 4A, one of the text portions 414 of the first user generated content element 404 was "ciao a tutti, mi chiamo Ernesto," which translated to English means "hello world, my name is Ernesto." In this example, the text modification module 308 has removed the text portion 414 from the text element 410 and has inserted a translated version of the text portion 420, i.e., "hello world, my name is Ernesto" into the text element 416. Further, the text modification module 308 has created a new "original text" element 418, and has inserted the original text portion 414, i.e., "ciao a tutti, mi chiamo Ernesto," into the original text element 418. It is appreciated that the text modification module 308 may do this for all user generated content that include text portions that have been translated. Once the entire content feed has been analyzed and all eligible text portions of user generated content have been translated, the website data, including the modified content feed, are provided to the display module 302.

As mentioned above, the display module 302 receives the website data and renders an image corresponding to the website data that is displayed via the user interface 112 of the viewing user terminal 108. Depending on the configuration of the display module 302, the original text portion can be selectively displayed, i.e., the original text portion may or may not be displayed to the viewing user. In some embodiments, the viewing user is given an option of displaying or hiding the original text.

Figure 5:
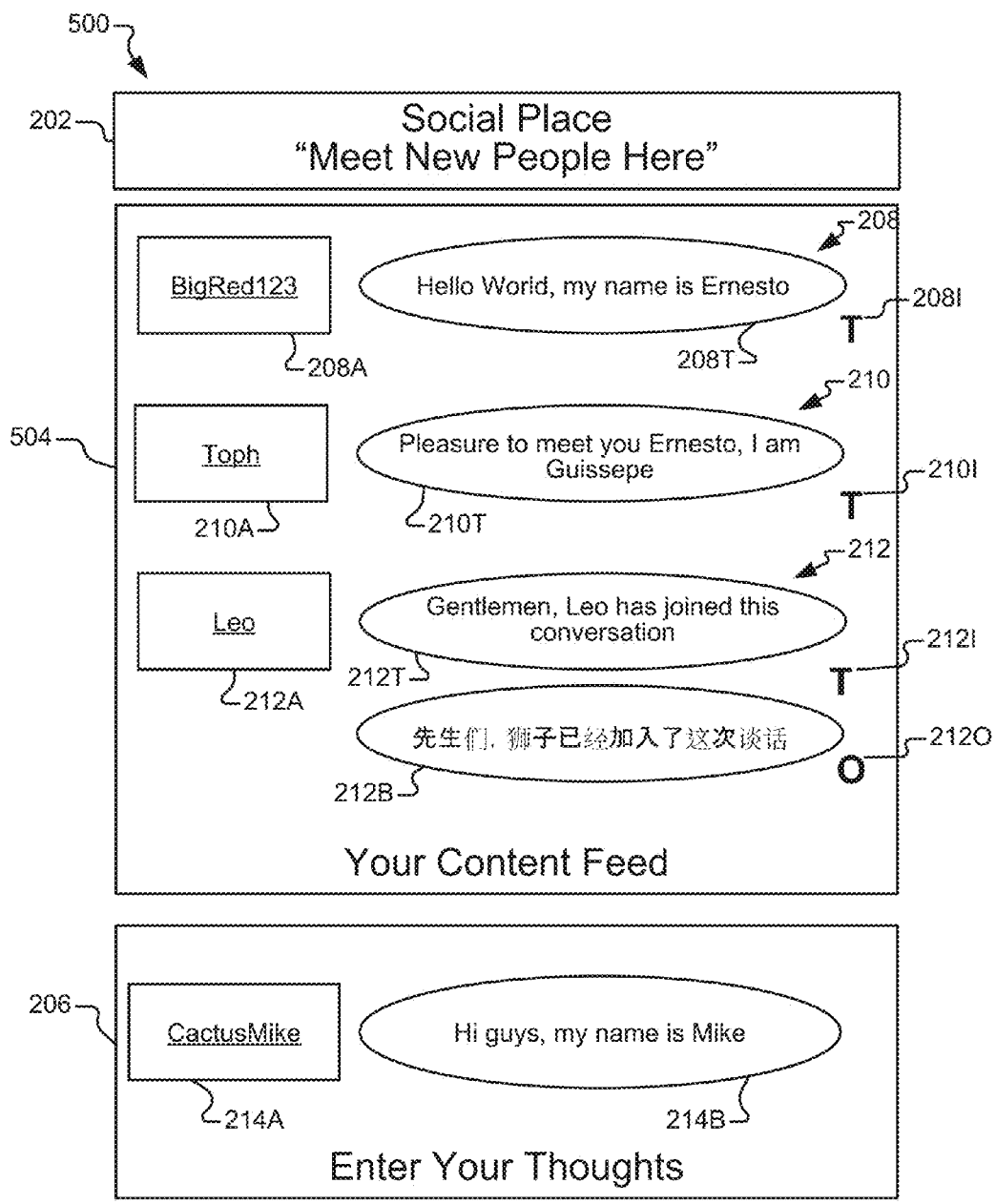
FIG. 5 is an exemplary screen shot of the social website of FIG. 1, including a translated content feed, according to some embodiments of the present disclosure.

FIG. 5 illustrates an example of a screen shot 500 of a social website 100, including a content feed 504 translated versions of the text portions that have been translated. It should be appreciated that the content feed 504 depicted in the screen shot 500 correspond to the content feed 204 depicted in the screen shot 200 of FIG. 2. The content feed 504 includes a first user generated content 208 including the first user handle 208A and a first translated text portion 208T that corresponds to the first text portion 208B (FIG. 2). Further, a first clickable icon 2081 is shown next to the translated text portion 208T, such that if the user clicks on the clickable icon 2081, the original text portion 208B ("ciao a tutti, mi chiamo Ernesto") will be shown. The screen shot 500 further depicts a second user generated content 210, including the second user handle 210A and a second translated text portion 210T. The screen shot 500 also shows a third user generated content 212. With respect to the third user generated content 212, the viewing user has selected to show the original text portion 212B in addition to the translated text portion 212T. A clickable icon 2120 is provided by the original text portion 212B, such that if the user clicks on the icon 2120, the original text portion 212B is hidden. As can be appreciated, the viewing user, Cactus-Mike, can enter text in the area 214B for entering text and participate in the conversation. It is appreciated that the foregoing example is provided for example only and not intended to be limiting.

Figure 6:
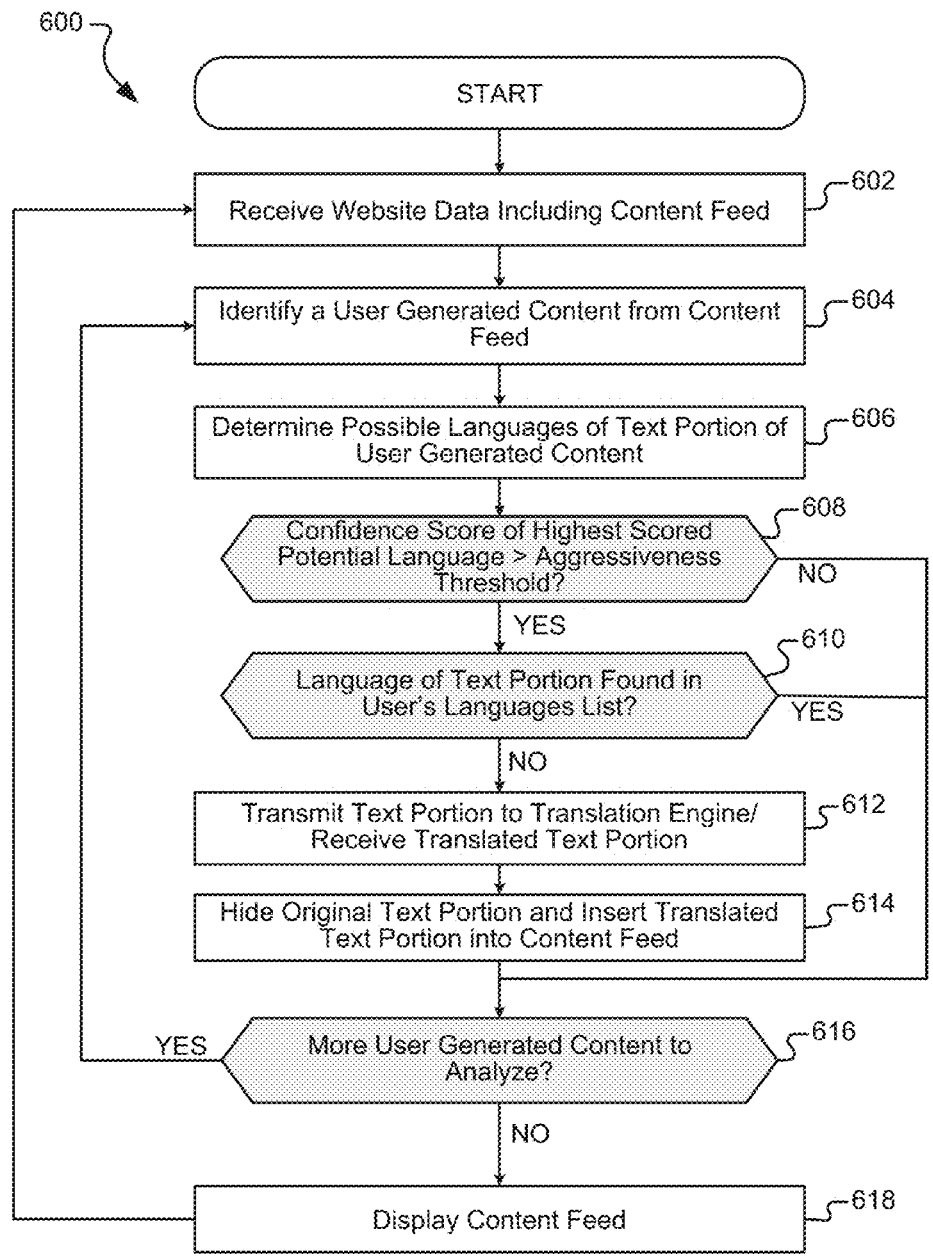
FIG. 6 is a flow chart illustrating exemplary steps of a technique for translating user generated content according to some embodiments of the present disclosure.

FIG. 6 illustrates an exemplary technique 600 according to some embodiments of the present disclosure that may be executed, for example, by the content feed analysis module 300. At step 602, the text determination module 304 receives the website data, including the content feed, from the web server 102. As was described above, the content feed will include a plurality of user generated content that may be in a plurality of different languages. As shown at step 604, the text determination module 304 parses the website data to identify the content feed, and from the content feed, the text determination module 304 identifies the individual user generated content. In some embodiments, as described above, the text determination module 304 will examine a DOM 400 corresponding to the website data to identify the user generated content and a text portion 414 of the user generated content.

Once the text portion of the user generated content is identified, the text analysis module 306 determines the possible languages of the text portion as shown at step 606. The text analysis module 306 provides the text portion of the user generated content to the language determination engine 316. The language determination engine 316 returns a list of possible language classifications and confidence scores corresponding thereto to the text analysis module 306. At step 608, the text analysis module 306 selects the potential language classification having the highest confidence score from the list of potential language classifications, and compares the confidence score of the selected potential language classification to the threshold indicated by the aggressiveness setting, e.g., indicated by the user settings stored in the user settings datastore 310 of the viewing user. If the confidence score of the selected potential language classification is greater than the threshold indicated by the aggressiveness setting, the potential language classification is adopted as the original language of the text portion of the user generated content.

If the potential language classification is adopted as the original language of the text portion of the user generated content, the text analysis module 306 determines whether the original language is foreign to the viewing user, as shown at step 610. The text analysis module 306 can compare the original language with the languages that are stored in the language set in the user settings datastore 310, i.e., the primary language and the secondary languages of the viewing user. If the original language of the text portion is the primary language or one of the secondary languages, the text portion is not translated and the method 600 proceeds to step 616. If, however, the original language of the text portion is not one of the primary language or secondary languages, then the text portion is transmitted to the translation engine 316, as shown at step 612. The text analysis module 306 provides the text portion, the original language of the text portion, and the primary language indicator in the user settings datastore 310 to the translation engine 314. The translation engine 314 translates the text portion from the original language to the primary language and returns the translated text portion to the text analysis module 306.

The translated text portion is provided to the text modification module 308. The text modification module 308 inserts the translated text portion into the content feed to obtain a modified content feed, as shown at step 614. As described above, the text modification module 308 may insert the translated text into a DOM 400 corresponding to a website data. Furthermore, the text modification module 308 may hide the original text portion of the user generated content. Once a user generated content from the content feed has been analyzed, the text determination module 304 determines whether there are more user generated content to analyze, as shown at step 616. If so, the method will continue to execute in the manner described above. If all of the user generated content in the content feed has been analyzed, then the modified content feed is displayed by the display module 302, as shown at step 618. It is appreciated that many content feeds are continuously updated so the method will return to step 602 such that the updated content feed is continuously displayed to the viewing user.

The foregoing method is provided for example only. It is appreciated that variations of the method may be implemented and are within the scope of this disclosure. Furthermore, some or all of the steps displayed in the method depicted in FIG. 6 may be arranged in any order, divided into multiple steps, and multiple steps may be combined into a single step.

Figure 7:
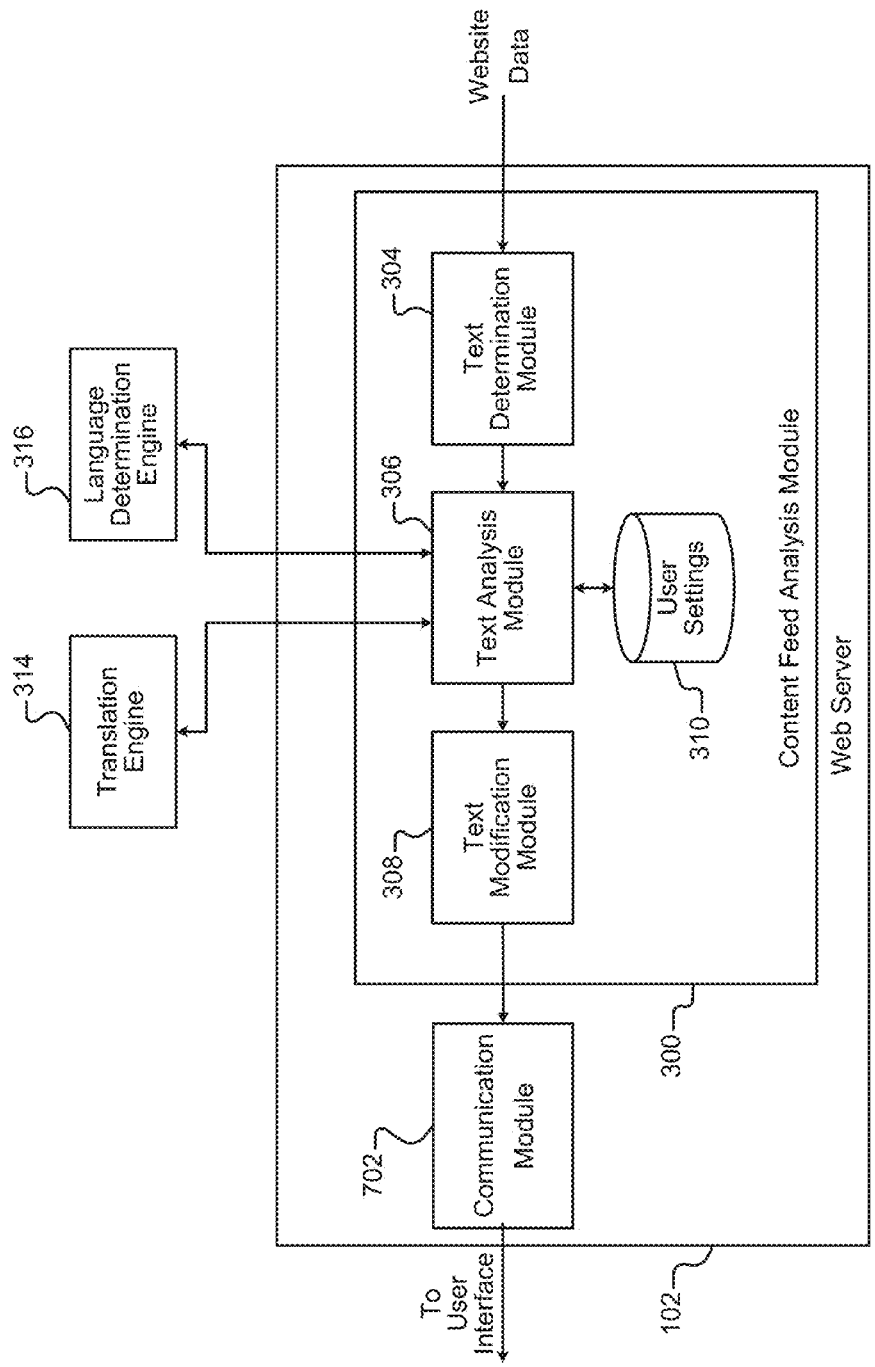
FIG. 7 is a schematic block diagram illustrating exemplary components of a web server according to some embodiments of the present disclosure.

FIG. 7 illustrates an example of an alternative technique 700 for performing language determination and translation of a multi-language content feed, such as content feed 204. In this example technique, the content feed analysis module 304 may be implemented at the web server 102. The web server 102 is comprised of a content feed analysis module 702 and a communication module 704.

The content feed analysis module 702 operates in a manner that is similar to the content feed analysis module 702 described above. According to the present example, the content feed analysis module 702 can include a text analysis module 306, a text modification module 308, and a user settings datastore 310. As previously discussed, the content feed analysis module 702, in particular the text analysis module 306, may be in communication with a language determination engine 316 and a translation engine 314.

In operation, the web server 102 hosts may host a social media website 100 that provides website data that may include a content feed to a viewing user. The text determination module 304 receives website data that is to be delivered to the viewing user and determines whether the website data includes a parsable content feed. If so, the text determination module 304 parses the content feed to identify text portions of user-generated content. It is appreciated that the content feed can be parsed in any suitable fashion, including in the manner described above. The text portions of the content feed can be provided to the text analysis module 306.

The text analysis module 306 receives a text portion of the content feed and an identity of the viewing user to whom the website data is being communicated to. In embodiments where the content analysis module 702 is implemented on a web server 102, it is appreciated that many users may access the website 100. Thus, the user settings datastore 310 stores user settings for a plurality of different viewing users. Thus, the text analysis module 306 can retrieve the user settings of the viewing user to whom the website data is being communicated to. As described above, the user settings of the viewing user can include the primary language of the viewing user and any other preferred languages of the viewing user. The text analysis module 306 provides text portion to the language determination engine 316 and receives a determination of an original language of the text portion from the language determination engine 316. If the original language of the text portion is not in the primary language of the viewing user, or in any of the preferred languages of the viewing user, the text analysis module 306 provides the translation engine 314 with the text portion, the original language of the text portion, and the primary language of the viewing user. The translation engine 314 returns a translated text portion in the primary language of the viewing user. The text analysis module 306 provides the translated text portion to the text modification module 308.

The text modification module 308 receives the translated text portion and inserts the translated test portion into the content feed in place of the original text portion. It is appreciated that the text modification module 308 may insert the translated text portion into the content feed in any suitable fashion, including the manner described above. Once the entire content feed has been analyzed, and any translatable text portions have been translated and inserted into the content feed, the content feed analysis module 300 provides the modified content feed to the communication module 702, which is included the website data. The communication module 702 transmits the website data, including the modified content feed, if applicable, to the terminal 108 of the viewing user. A web browser 110 on the terminal 108 of the viewing user can display the website corresponding to the transmitted website data, including the modified content feed to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code, or a process executed by a distributed network of processors and storage in networked clusters or datacenters; other suitable components that provide the described functionality; or a combination of some or all of the above, such as in a system-on-chip. The term module may include memory (shared, dedicated, or group) that stores code executed by the one or more processors.

The term code, as used above, may include software, firmware, bytecode and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
    obtaining, at a computing device having one or more processors, a parsable content feed from at least one server associated with a social network comprising a plurality of users, the parsable content feed comprising at least one of (i) user-generated text posts on the social network and (ii) user-generated text comments to posts on the social network;
    obtaining, at the computing device, a set of preferred languages for a user operating the computing device, the user being one of the plurality of users;
    identifying, at the computing device, a text portion in the parsable content feed, the text portion being a sub-portion of text of the parsable content feed;
    obtaining, at the computing device, a detected language for the text portion;
    comparing, at the computing device, the detected language to the set of preferred languages for the user;
    when the detected language does not match any of the set of preferred languages, displaying, by the computing device and proximate to the text portion in the parsable content feed, a clickable icon configured for displaying a machine translation of the text portion and the text portion, the machine translation of the text portion being to one of the set of preferred languages for the user; and
    displaying, by the computing device and in response to a user selection of the clickable icon, the machine translation of the text portion and the text portion in the parsable content feed.

2. The computer-implemented method of claim 1, further comprising displaying, by the computing device, an indication of the machine translation of the text portion at a location proximate to the machine translation of the text portion.

3. The computer-implemented method of claim 1, wherein the displaying of the machine translation of the text portion in the parsable content feed is concurrent with the displaying of the text portion in the parsable content feed.

4. The computer-implemented method of claim 1, wherein the displaying of the machine translation of the text portion is after the text portion in the parsable content feed.

5. The computer-implemented method of claim 1, further comprising:
    in response to the user selection of the clickable icon, transmitting a request for the machine translation of the text portion; and
    after transmitting the request, receiving the machine translation of the text portion, wherein receipt of the machine translation of the text portion causes the computing device to display it in the parsable content feed.

6. A computer-implemented method, comprising:

receiving, at a server having one or more processors and associated with a social network comprising a plurality of users, a first request for a parsable content feed from a computing device associated with a user of the plurality of users, the parsable content feed comprising at least one of (i) user-generated text posts on the social network and (ii) user-generated text comments to posts on the social network, wherein the parsable content feed comprises a text portion in a source language, the text portion being a sub-portion of text of the parsable content feed;

transmitting, from the server to the computing device, the parsable content feed in response to the first request;

detecting, at the server, the source language of the text portion to obtain a detected source language;

comparing, at the server, the detected source language to a set of preferred languages for the user; and when the detected source language does not match any of the set of preferred languages, outputting, from the server to the computing device, a clickable icon for display in the parsable content feed proximate to the text portion, the clickable icon being configured to display a machine translation of the text portion and the text portion in the parsable content feed, the machine translation of the text portion being in one of the set of preferred languages for the user.

7. The computer-implemented method of claim 6, further comprising outputting, from the server to the computing device, an indication of the machine translation of the text portion, wherein receipt of the indication causes the computing device to display the indication proximate to the machine translation of the text portion.

8. The computer-implemented method of claim 6, wherein the machine translation of the text portion is displayed concurrently with the text portion in the parsable content feed.

9. The computer-implemented method of claim 6, wherein the machine translation of the text portion is displayed after the text portion in the parsable content feed.

10. The computer-implemented method of claim 6, wherein the clickable icon is configured to generate a second request for the machine translation of the text portion, and further comprising:

receiving, at the server from the computing device, the second request;

in response to receiving the second request, obtaining the machine translation of the text portion to one of the set of preferred languages for the user; and transmitting, from the server to the computing device, the machine translation of the text portion, wherein receipt of the machine translation of the text portion causes the computing device to display the machine translation of the text portion and the text portion in the parsable content feed.

11. A computing device, comprising:

a non-transitory computer-readable medium having a set of instructions stored thereon; and one or more processors configured to execute the set of instructions, which causes the computing device to perform operations comprising:

obtaining a parsable content feed from at least one server associated with a social network comprising a plurality of users, the parsable content feed comprising at least one of (i) user-generated text posts on the social network and (ii) user-generated text comments to posts on the social network;

obtaining a set of preferred languages for a user operating the computing device, the user being one of the plurality of users;

identifying a text portion in the parsable content feed, the text portion being a sub-portion of text of the parsable content feed;

obtaining a detected language for the text portion;

comparing the detected language to the set of preferred languages for the user;

when the detected language does not match any of the set of preferred languages, displaying, proximate to the text portion in the parsable content feed, a clickable icon configured for displaying a machine translation of the text portion and the text portion, the machine translation of the text portion being to one of the set of preferred languages for the user; and displaying, in response to a user selection of the clickable icon, the machine translation of the text portion and the text portion of the parsable content feed.

12. The computing device of claim 11, wherein the operations further comprise displaying an indication of the machine translation of the text portion at a location proximate to the machine translation of the text portion.

13. The computing device of claim 11, wherein the displaying of the machine translation of the text portion in the parsable content feed is concurrent with the displaying of the text portion in the parsable content feed.

14. The computing device of claim 11, wherein the displaying of the machine translation of the text portion is after the text portion in the parsable content feed.

15. The computing device of claim 11, wherein the operations further comprise:

in response to the user selection of the clickable icon, transmitting a request for the machine translation of the text portion; and after transmitting the request, receiving the machine translation of the text portion, wherein receipt of the machine translation of the text portion causes the computing device to display it in the parsable content feed.

16. A server associated with a social network comprising a plurality of users, the server comprising:

a non-transitory computer-readable medium having a set of instructions stored thereon; and one or more processors configured to execute the set of instructions, which causes the server to perform operations comprising:

receiving a first request for a parsable content feed from a computing device associated with a user of the plurality of users, the parsable content feed comprising at least one of (i) user-generated text posts on the social network and (ii) user-generated text comments to posts on the social network, wherein the parsable content feed comprises a text portion in a source language, the text portion being a sub-portion of text of the parsable content feed;

transmitting, to the computing device, the parsable content feed in response to the first request;

detecting the source language of the text portion to obtain a detected source language;

comparing the detected source language to a set of preferred languages for the user; and when the detected source language does not match any of the set of preferred languages, outputting, to the computing device, a clickable icon for display in the parsable content feed proximate to the text portion, the clickable icon being configured to display a machine translation of the text portion and the text portion in the parsable content feed, the machine translation of the text portion being in one of the set of preferred languages for the user.

17. The server of claim 16, wherein the operations further comprise outputting, to the computing device, an indication of the machine translation of the text portion, wherein receipt of the indication causes the computing device to display the indication proximate to the machine translation of the text portion.

18. The server of claim 16, wherein the machine translation of the text portion is displayed concurrently with the text portion in the parsable content feed.

19. The server of claim 16, wherein the machine translation of the text portion is displayed after the text portion in the parsable content feed.

20. The server of claim 16, wherein the clickable icon is configured to generate a second request for the machine translation of the text portion, and wherein the operations further comprise:
   receiving, from the computing device, the second request;
   in response to receiving the second request, obtaining the machine translation of the text portion to one of the set of preferred languages for the user; and
   transmitting, to the computing device, the machine translation of the text portion, wherein receipt of the machine translation of the text portion causes the computing device to display the machine translation of the text portion and the text portion in the parsable content feed.

* * * * *